United States Patent
Kwon et al.

(10) Patent No.: US 10,438,081 B2
(45) Date of Patent: Oct. 8, 2019

(54) AUTOMATIC FEATURE POINT DETECTION FOR CALIBRATION OF MULTI-CAMERA SYSTEMS

(71) Applicant: TEXAS INSTRUMENTS INCORPORATED, Dallas, TX (US)

(72) Inventors: Do-Kyoung Kwon, Allen, TX (US); Aziz Umit Batur, Torrance, CA (US); Vikram Appia, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 322 days.

(21) Appl. No.: 15/294,369

(22) Filed: Oct. 14, 2016

(65) Prior Publication Data

US 2017/0124710 A1 May 4, 2017

Related U.S. Application Data

(60) Provisional application No. 62/249,031, filed on Oct. 30, 2015.

(51) Int. Cl.
*G06K 9/32* (2006.01)
*G06K 9/46* (2006.01)
*G06T 7/80* (2017.01)
*H04N 5/232* (2006.01)

(52) U.S. Cl.
CPC ......... *G06K 9/3216* (2013.01); *G06K 9/4671* (2013.01); *G06T 7/80* (2017.01); *G06T 2207/30204* (2013.01); *G06T 2207/30248* (2013.01); *H04N 5/23238* (2013.01)

(58) Field of Classification Search
CPC ...... G06K 9/3216; G06K 9/4671; G06T 7/80; G06T 2207/30204; G06T 2207/30248; H04N 5/23238
USPC .......................................................... 382/199
See application file for complete search history.

(56) References Cited

U.S. PATENT DOCUMENTS

2009/0299684 A1* 12/2009 Imanishi ............ G06K 9/00791
702/150
2015/0302561 A1 10/2015 Pekkucuksen et al.

OTHER PUBLICATIONS

L.F.F. Belussi et al., "Fast QR Code Detection in Arbitrarily Acquired Images," 2011 24th SIBGRAPI Conference on Graphics, Patterns and Images, pp. 281-288, 2011 (8 pages).

* cited by examiner

*Primary Examiner* — Amandeep Saini
(74) *Attorney, Agent, or Firm* — Ebby Abraham; Charles A. Brill; Frank D. Cimino

(57) ABSTRACT

In some embodiments, a computer-readable medium stores executable code, which, when executed by a processor, causes the processor to: capture an image of a finder pattern using a camera; locate a predetermined point within the finder pattern; use the predetermined point to identify multiple boundary points on a perimeter associated with the finder pattern; identify fitted boundary lines based on the multiple boundary points; and locate feature points using the fitted boundary lines.

9 Claims, 10 Drawing Sheets

AUTOMATIC FEATURE POINT DETECTION FOR CALIBRATION OF MULTI-CAMERA SYSTEMS

CROSS-REFERENCE TO RELATED APPLICATION

This non-provisional application claims priority to U.S. Provisional Application No. 62/249,031, which was filed on Oct. 30, 2015 and is incorporated herein by reference in its entirety.

BACKGROUND

Many camera systems include multiple cameras whose images must be integrated to form a single, cohesive image. For example, some vehicles include "bird's eye view" camera systems that include multiple fish-eye lens cameras placed along the exterior perimeter of the vehicle. The images obtained from these multiple cameras are integrated into a single image that is then displayed to the driver. That single, integrated image offers the illusion of a top-down view of the vehicle from the sky.

Prior to deployment, a multi-camera system must be calibrated to properly integrate the images captured by the multiple cameras. Without proper calibration, multi-camera systems may produce integrated images that are inaccurate. Multi-camera system calibration, however, is a tedious and time-consuming process.

SUMMARY

In some embodiments, a computer-readable medium stores executable code, which, when executed by a processor, causes the processor to: capture an image of a finder pattern using a camera; locate a predetermined point in the finder pattern; use the predetermined point to identify multiple boundary points on a perimeter associated with the finder pattern; identify fitted boundary lines based on the multiple boundary points; and locate feature points using the fitted boundary lines. One or more such embodiments may be supplemented using one or more of the following concepts, in any order and in any combination: wherein the finder pattern comprises a first square positioned within a second square; wherein the finder pattern comprises a first square positioned within a second square, and wherein the first and second squares are positioned within a third square; wherein the processor binarizes the image, and, after binarization, the first and third squares share a common color that is different from a color of the second square; wherein said image is a fish-eye lens image; wherein, to identify said multiple boundary points, the processor identifies multiple, equally-spaced lines passing through the predetermined point and determines the points at which said multiple lines intersect said perimeter associated with the finder pattern; wherein said perimeter is a perimeter of a square in the finder pattern; wherein, to determine said points at which the multiple lines intersect the perimeter, the processor identifies at least one color transition.

In some embodiments, a method comprises: capturing an image of a finder pattern using a first camera in a multi-camera system; locating a predetermined point in the finder pattern; locating multiple boundary points along a perimeter of the finder pattern using said predetermined point; fitting boundary lines along the perimeter of the finder pattern using said multiple boundary points; locating feature points along said perimeter using the fitted boundary lines; and generating a perspective transformation matrix based on said feature points. One or more such embodiments may be supplemented using one or more of the following concepts, in any order and in any combination: wherein said predetermined point of the finder pattern is the center of the finder pattern; wherein the finder pattern comprises a first square centered within a second square; further comprising binarizing the image, wherein, after said binarization is complete, one of the first and second squares is white and the other of the first and second squares is black; wherein said binarized image includes said finder pattern positioned on an object, said object has a color matching that of the first square; further comprising using the perspective transformation matrix to generate a bird's-eye view of an object on which said multi-camera system is mounted; wherein locating the predetermined point of the finder pattern comprises identifying a point in said finder pattern that lies along a line that intersects each perimeter of the finder pattern twice, wherein said line has multiple segments, each segment located between a different pair of consecutive perimeter crossings, and wherein a ratio of the lengths of said segments falls within a predetermined ratio range; wherein locating said multiple boundary points comprises identifying points at which a line passing through the predetermined point intersects said perimeter of the finder pattern; wherein said feature points are points at which said fitted boundary lines intersect.

In some embodiments, a system comprises: a camera configured to capture an image of a finder pattern; and a processor coupled to the camera and configured to identify a center of the finder pattern in the image, to locate one or more feature points of the finder pattern based on said center, and to calibrate the system using said one or more feature points. One or more such embodiments may be supplemented using one or more of the following concepts, in any order and in any combination: wherein the processor is further configured to locate multiple boundary points along a perimeter associated with the finder pattern based on the center, wherein the processor locates said one or more feature points based on the boundary points; wherein the process is further configured to identify multiple fitted boundary lines based on the multiple boundary points, and wherein the processor locates said one or more feature points based on the multiple fitted boundary lines.

DETAILED DESCRIPTION

Figure 1:
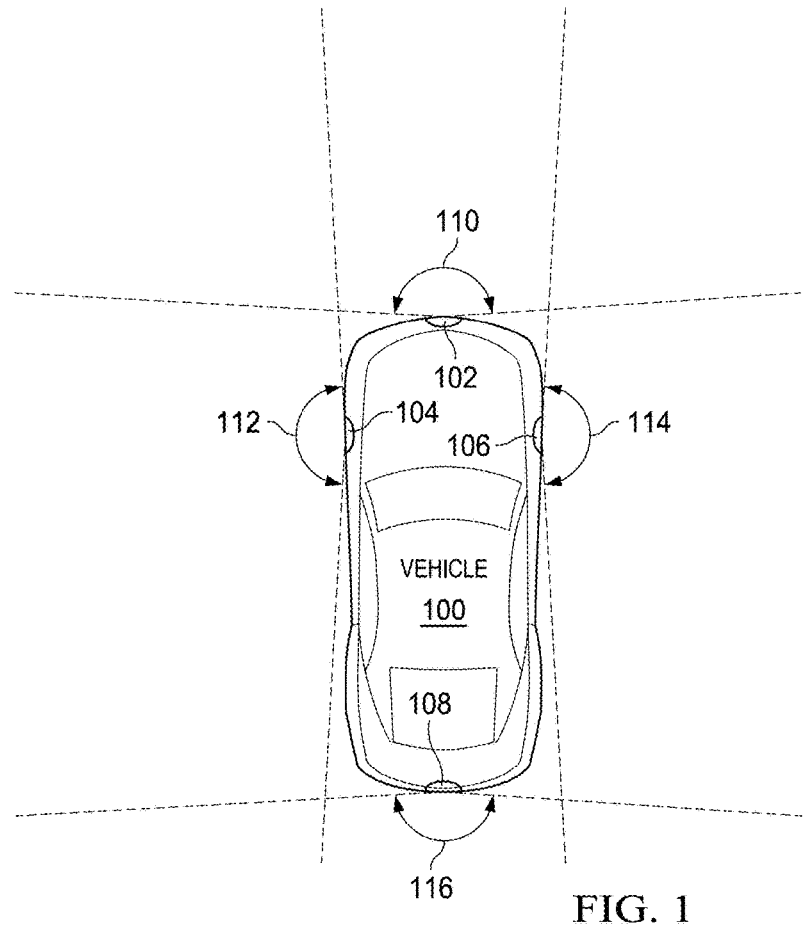
FIG. 1 is a top-down view of an illustrative vehicle having multiple cameras mounted thereupon.

A multi-camera system must be calibrated so that images captured from different cameras can be properly integrated with each other to form a single, accurate image. The calibration process requires capturing a sample image from each camera in the multi-camera system, where each image has a point of reference in common with at least one other image. Such points of reference may then be used to determine how each image correlates with the other images.

This disclosure presents various embodiments of a "finder pattern," which is a predetermined pattern that has specific features—called feature points—that serve as such points of reference for calibration purposes. This disclosure also presents various embodiments of a technique for automatically detecting such feature points and of systems for implementing such techniques. Once detected, the feature points are used to determine how the images from the different cameras fit together—that is, the feature points are used to determine a perspective transformation matrix. This matrix may then be programmed into the computer of a multi-camera system (e.g., in a vehicle) and used to integrate images simultaneously captured by the different cameras of the multi-camera system.

For example and without limitation, such embodiments may find application in motor vehicles. Vehicles often have fish-eye lens cameras mounted around the perimeter of the vehicle—for instance, on the grille at the front of the vehicle, on each of the side-view mirrors, and on the trunk door at the rear of the vehicle. These cameras help detect dangerous situations, such as an imminent collision with another vehicle or a pedestrian. They may also aid in performing parking maneuvers. Such cameras are particularly useful when the images from the cameras can be combined to form a single, cohesive image, such as a top-down, bird's-eye view of the vehicle. Accordingly, after the cameras are mounted in fixed, permanent positions on the vehicle by a manufacturer, they may be calibrated using the systems and methods described herein. The calibration process entails arranging multiple finder patterns on the ground around the perimeter of the vehicle. The techniques and systems disclosed herein are then used to automatically detect the feature points on the finder patterns. Once the feature points on the finder patterns have been identified, they may be used to determine a perspective transformation matrix. A computer in the vehicle is programmed with the perspective transformation matrix so that any subsequent images simultaneously captured from the different cameras in the multi-camera system may be properly integrated to form an accurate, single, cohesive image. One advantage gained by the techniques and systems disclosed herein is the rapid, accurate, and automatic detection of feature points on finder patterns, which replaces the tedious, manual techniques currently used. This advantage results in significantly reduced calibration times and associated manufacturing costs.

FIG. 1 is a top-down view of an illustrative vehicle 100 comprising a multi-camera system. Specifically, the vehicle 100 includes cameras 102, 104, 106, and 108 mounted thereupon, and it may additionally include a computer and other hardware and/or software (not expressly shown in FIG. 1). The camera 102 is depicted as having been mounted on the front of the vehicle 100 (e.g., on the grille); the cameras 104 and 106 are depicted as having been mounted on opposing sides of the vehicle 100 (e.g., on the side-view mirrors); and the camera 108 is depicted as having been mounted on a rear of the vehicle 100 (e.g., on the trunk door). The cameras are, in at least some embodiments, fish-eye lens cameras, but the scope of disclosure is not limited as such. The field of vision of camera 102 has an angle 110; the field of vision of camera 104 has an angle 112; the field of vision of camera 106 has an angle 114; and the field of vision of camera 108 has an angle 116. The fields of vision and associated angles are illustrative, and each camera may have a wider or narrower field of vision than depicted. In at least some embodiments, however, the field of vision for each camera is wide enough so that each camera can visualize a finder pattern that can also be visualized by another camera. An illustrative finder pattern arrangement is described in detail below with respect to FIG. 4. Although this disclosure uses vehicular applications as a running example to describe various embodiments, the systems and methods described herein are not limited to vehicular applications.

Figure 2:
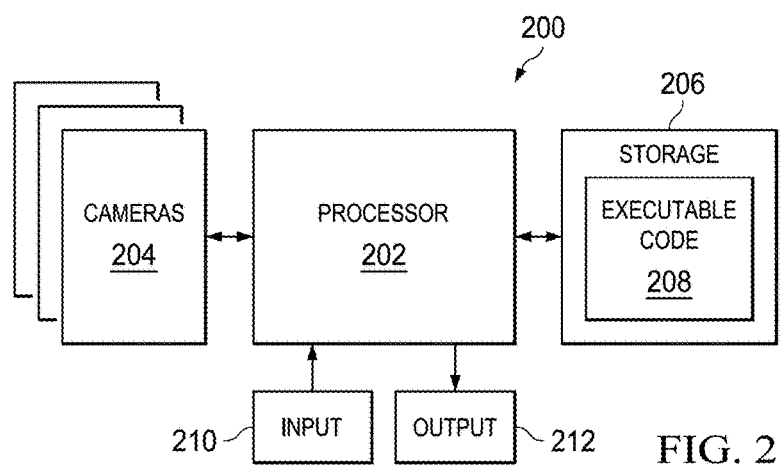
FIG. 2 is a block diagram of an illustrative multi-camera system configured to perform the techniques described herein.

FIG. 2 is a block diagram of an illustrative multi-camera system 200. The system 200 is capable of automatically (i.e., without sustained human direction or intervention) performing any and all of the techniques disclosed herein. The system 200 comprises a processor 202; multiple cameras 204 coupled to the processor 202; storage 206 (e.g., random access memory (RAM), read-only memory (ROM)) storing executable code 208 (e.g., software, firmware); one or more inputs 210 (e.g., a keyboard, touchscreen display, mouse); and one or more outputs 212 (e.g., a display). In some embodiments, the system 200 is housed within a vehicle in its entirety. In some embodiments, only a portion of the system 200 (e.g., the processor 202, the cameras 204, the storage 206 and the executable code 208) is housed within the vehicle. In some embodiments, none of the system 200 is housed within the vehicle; instead, the system 200 is used to develop a perspective transformation matrix during vehicle manufacture, and the matrix is subsequently programmed into a different computer system that is housed within the vehicle. Similar variations of embodiments are contemplated for other, non-vehicular applications.

Figure 3A:
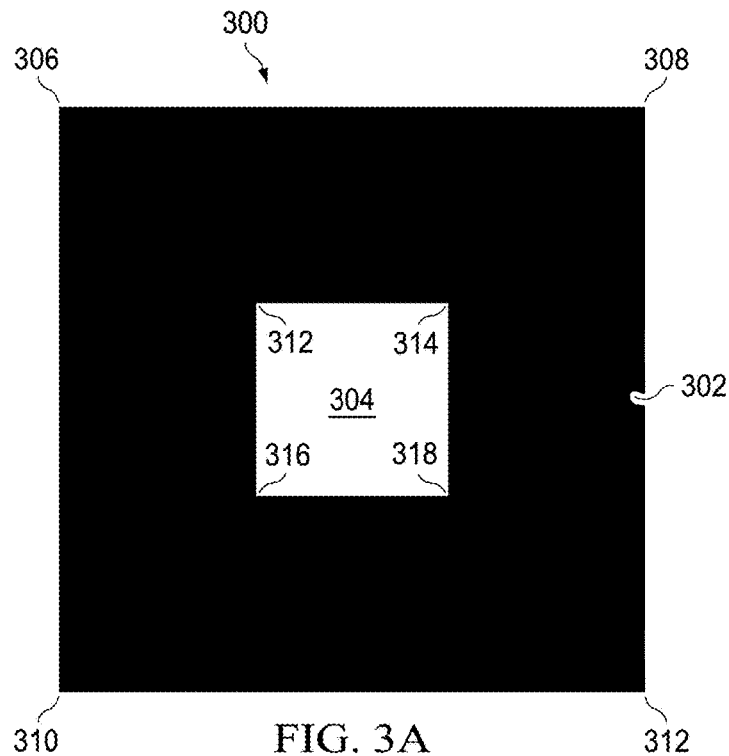
FIG. 3A is an illustrative finder pattern usable in conjunction with the techniques described herein.

FIG. 3A is an illustrative finder pattern 300 usable in conjunction with the techniques described herein. The finder pattern 300 may be illustrated (e.g., printed or painted) on any suitable material (e.g., paper or floor). The finder pattern 300 comprises a square 302 that contains a smaller square 304. In some embodiments, the square 304 is centered within the square 302 so that the two squares have a common center point. In some embodiments, the area of the square 304 is approximately ⅑ that of the square 302, although the scope of disclosure is not limited as such. In some embodiments, the squares 302 and 304 are colored so that, when an image of the squares is binarized, the squares 302 and 304 in the image appear to have different colors (e.g., the square 302 is black and the square 304 is white or vice versa). The finder pattern 300 has multiple perimeters—specifically, a perimeter of the square 302 and a perimeter of the square 304. The finder pattern 300 includes multiple feature points, some of which are located along the perimeter of the square 302 (i.e., feature points 306, 308, 310, and 312) and some of which are located along the perimeter of the square 304 (i.e., feature points 312, 314, 316, and 318). Generally, feature points are corners located in a finder pattern. The techniques described herein entail the automatic detection of such feature points in images captured by multi-camera systems. In some embodiments, prior to calibration, the finder pattern 300 is positioned on a background (e.g., sheet of paper) having a post-binarization color that is different than that of the square 302 (e.g., the background is white when the square 302 is black and vice versa).

Figure 3B:
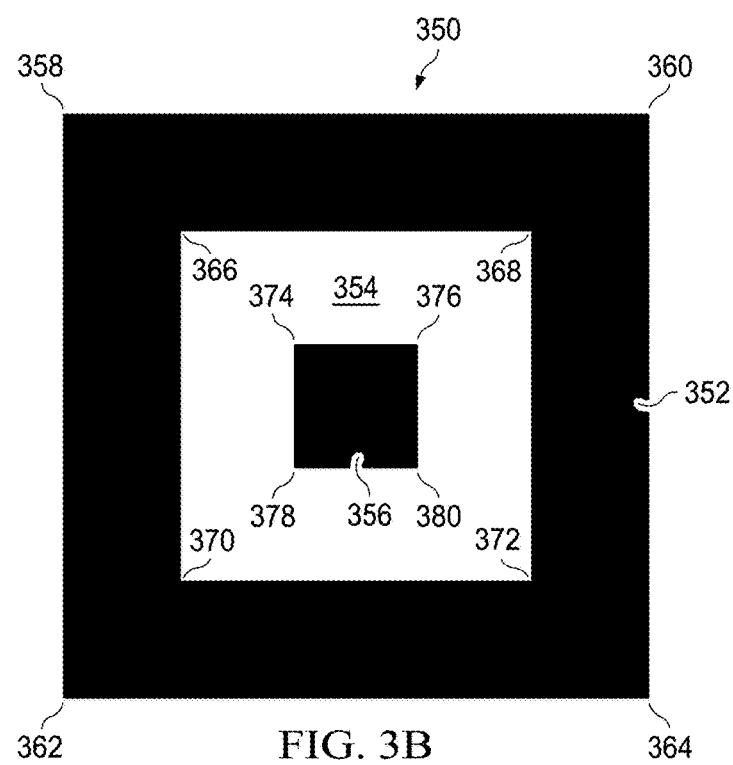
FIG. 3B is another illustrative finder pattern usable in conjunction with the techniques described herein.

FIG. 3B is another illustrative finder pattern 350 usable in conjunction with the techniques described herein. The finder pattern 350 includes a square 352, a square 354 positioned within the square 352, and a square 356 positioned within the square 354. In some embodiments, the square 356 is centered within the square 354 and the square 354 is centered within the square 352 so that all three squares share a common center point. In some embodiments, the area of the square 356 is approximately ½₅ that of the square 352 and approximately ⅑ that of the square 354, although the scope of disclosure is not limited as such. In some embodiments, the squares 352, 354, and 356 are colored so that, when an image of the squares is binarized, the squares 352 and 356 in the image appear to have identical colors (e.g., the squares 352 and 356 are both black or are both white), and the square 354 in the image appears to have a different color than squares 352 and 356 (e.g., square 354 appears black if squares 352 and 356 are white, and vice versa). The finder pattern 350 has multiple perimeters—specifically, a perimeter of the square 352, a perimeter of the square 354, and a perimeter of the square 356. The finder pattern 350 includes multiple feature points, some of which are located along the perimeter of the square 352 (i.e., feature points 358, 360, 362, and 364), some of which are located along the perimeter of the square 354 (i.e., feature points 366, 368, 370, and 372), and some of which are located along the perimeter of the square 356 (i.e., feature points 374, 376, 378, and 380). In some embodiments, prior to calibration, the finder pattern 350 is positioned on a background (e.g., sheet of paper) having a post-binarization color that is different than that of the square 352.

Figure 4:
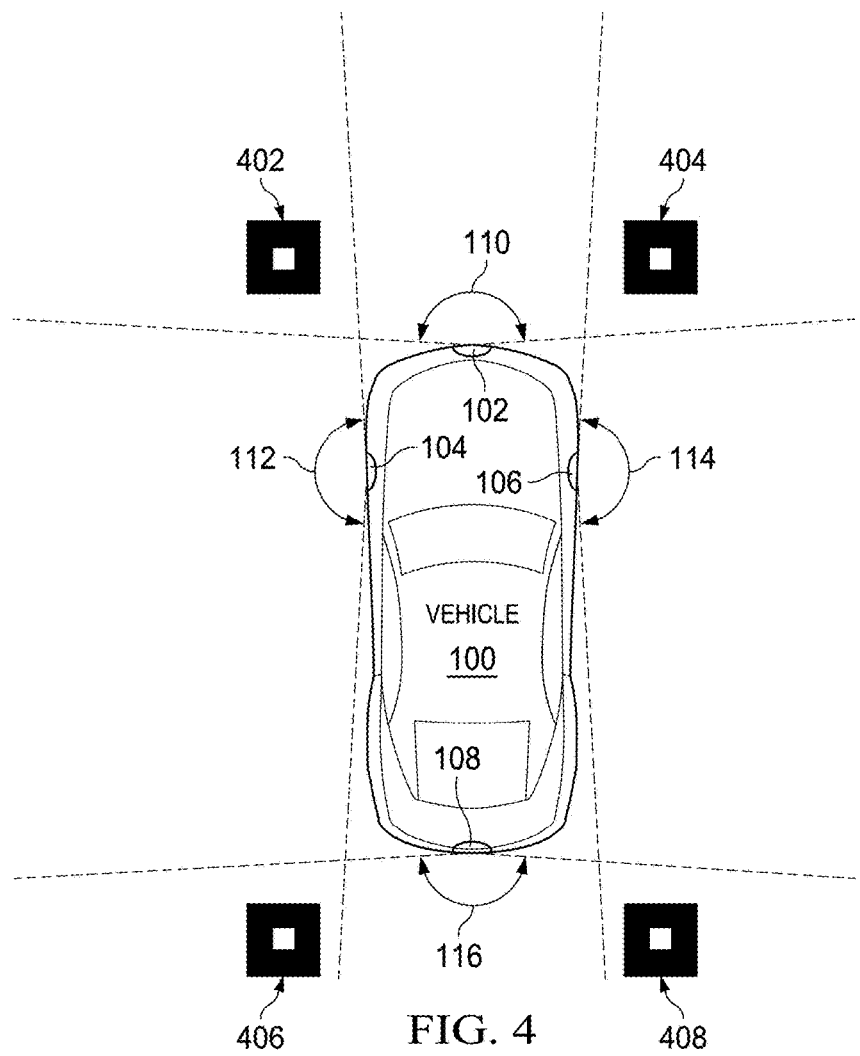
FIG. 4 depicts an illustrative arrangement of multiple finder patterns around a vehicle.

FIG. 4 depicts an illustrative arrangement of multiple finder patterns around the vehicle 100 of FIG. 1. Specifically, the vehicle 100 includes fixed, wide-angle cameras (e.g., fish-eye lens cameras) 102, 104, 106 and 108. The scope of disclosure is not limited to any particular type, number, or placement of cameras. Four finder patterns 402, 404, 406, and 408 are positioned around the vehicle 100 in such a way that each finder pattern can be simultaneously visualized by at least two of the four cameras. The scope of disclosure is not limited to any particular type, number, or placement of finder patterns. Thus, for instance, images of the finder pattern 402 may be captured by cameras 102 and 104; images of the finder pattern 404 may be captured by cameras 102 and 106; images of the finder pattern 406 may be captured by cameras 104 and 108; and images of the finder pattern 408 may be captured by cameras 106 and 108. In at least some embodiments, the finder patterns are positioned so that each image captured by each of the cameras in the multi-camera system includes at least two finder patterns. Thus, for instance, images captured by the camera 102 may include the finder patterns 402 and 404; images captured by the camera 104 may include the finder patterns 402 and 406; images captured by the camera 106 may include the finder patterns 404 and 408; and images captured by the camera 108 may include the finder patterns 406 and 408. In at least some embodiments, each finder pattern is placed as close as possible to the vehicle 100 while ensuring that that finder pattern can be simultaneously and completely visualized by at least two cameras. In at least some embodiments, the finder patterns are equidistant to the vehicle 100.

Figure 5A:
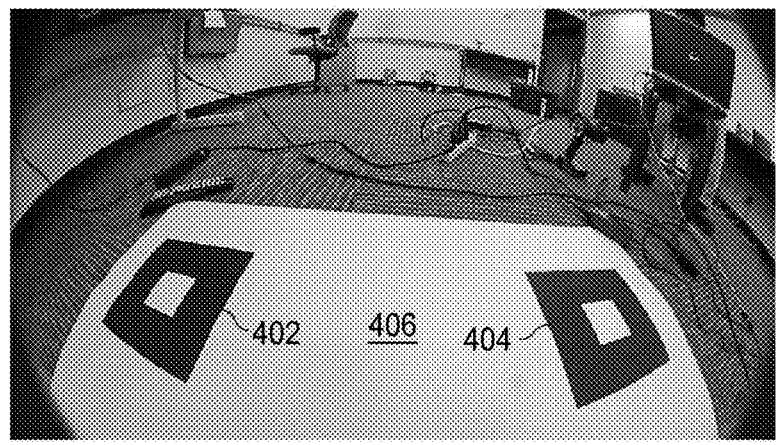
FIGS. 5A-5D are illustrative images of multiple finder patterns captured using a multi-camera system.
Figure 5B:
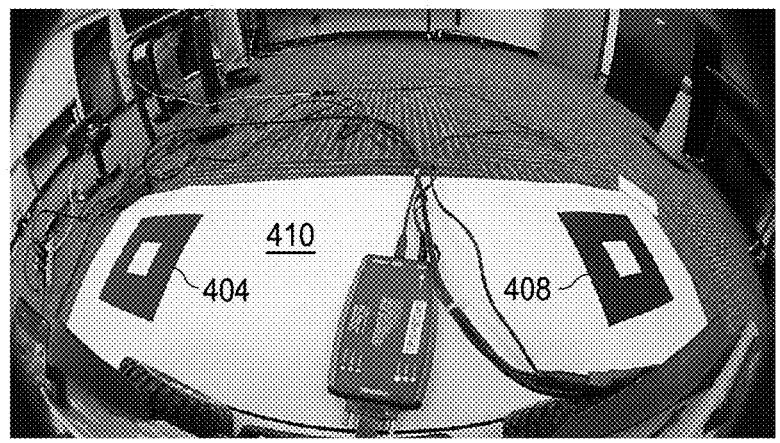
Figure 5C:
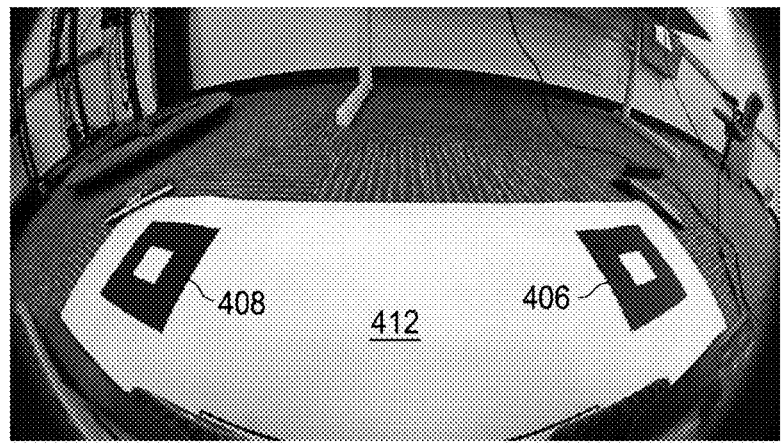
Figure 5D:
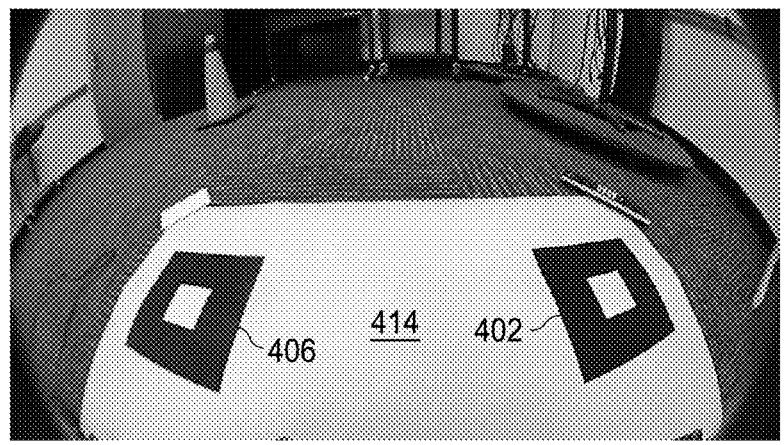

FIGS. 5A-5D are illustrative, raw images of multiple finder patterns captured using a multi-camera system. FIGS. 5A-5D may best be explained in reference to the arrangement of FIG. 4. Specifically, FIG. 5A shows a wide-angle image that may be captured by the front-mounted camera 102 shown in FIG. 4. The image of FIG. 5A includes the finder patterns 402 and 404, each of which rests on a background 406 that has a post-binarization color that is different than that of the outer squares in the finder patterns 402, 404. FIG. 5B shows a wide-angle image that may be captured by the right-side camera 106 shown in FIG. 4. The image of FIG. 5B includes the finder patterns 404 and 408, each of which rests on a background 410 that has a post-binarization color that is different than that of the outer squares in the finder patterns 404, 408. FIG. 5C shows a wide-angle image that may be captured by the rear-facing camera 108 shown in FIG. 4. The image of FIG. 5C includes the finder patterns 408 and 406, each of which rests on a background 412 that has a post-binarization color that is different than that of the outer squares in the finder patterns 408, 406. FIG. 5D shows a wide-angle image that may be captured by the left-side camera 104 shown in FIG. 4. The image of FIG. 5D includes the finder patterns 406 and 402, each of which rests on a background 414 that has a post-binarization color that is different than that of the outer squares in the finder patterns 406, 402. As described below, the multi-camera system automatically detects the feature points in the finder patterns of these raw images. The feature points may then be used to determine a perspective transformation matrix.

Figure 6:
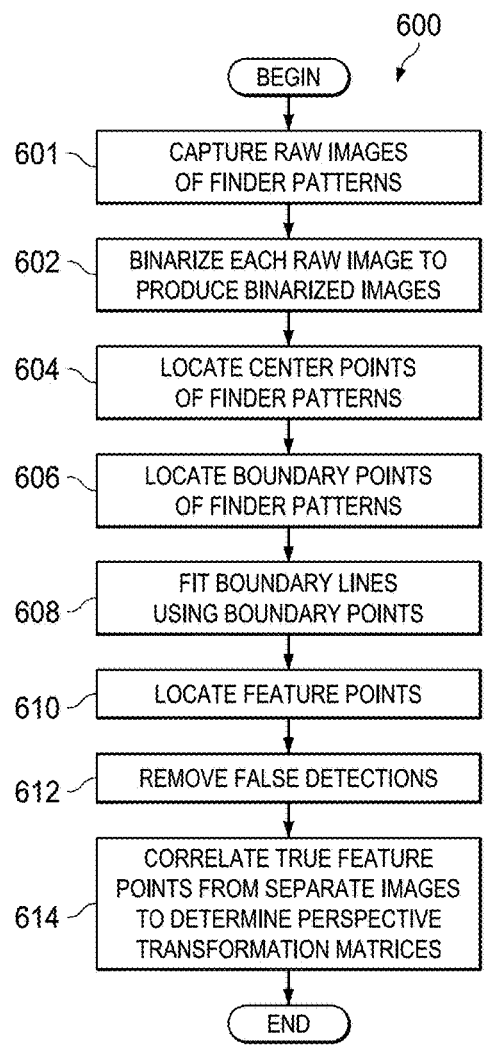
FIG. 6 is a flow diagram of a process to locate feature points on a finder pattern and to use the feature points to determine a perspective transformation matrix.

FIG. 6 is a flow diagram of a process 600 to automatically detect feature points on a finder pattern. The process 600 may be performed in part or in entirety by the multi-camera system 200 depicted in FIG. 2. The process 600 begins by capturing raw images of finder patterns (step 601). The raw images are captured by at least two different cameras, and, as explained, each finder pattern appears in at least two of the raw images so that the finder patterns may serve as points of reference. FIGS. 5A-5D exemplify such raw images.

Still referring to FIG. 6, the process 600 next includes binarizing each raw image to produce a set of binarized images (step 602). Binarization is the process of converting a raw image that is in grayscale or another color format to an image having only binary colors—e.g., each pixel is either black or white. Each pixel is binarized using the average pixel value of an area centered at the pixel. If the coordinate of a given pixel to be binarized is $(x_0, y_0)$, the average pixel value of an area around $(x_0, y_0)$ is calculated by:

$$avg = \frac{1}{(2N+1)\cdot(2N+1)} \sum_{i=-N}^{N} \sum_{j=-N}^{N} p(x_0 + i, y_0 + j), \qquad (1)$$

where $p(i, j)$ is the pixel value at $(i, j)$ and $(2N+1)$ is the number of pixels in the width or length of the image. Then, $p(x_0, y_0)$ is binarized as:

$$b(x_0, y_0) = \begin{cases} 2^{bit-depth} - 1, & \text{if } p(x_0, y_0) > avg \\ 0, & \text{otherwise.} \end{cases} \qquad (2)$$

where bit depth is the input bit depth, and $b(x_0, y_0)$ is the binary pixel value.

The process 600 subsequently comprises analyzing the images to detect any center points that may exist in each of the images, including the center points of the finder patterns (step 604). Stated another way, there are certain criteria—described below—that are used to detect the center points of the finder patterns in each image. However, in addition to the center points of the finder patterns, other points in each image also may satisfy the criteria for being center points. These false center point detections are removed later in the process 600; however, for purposes of step 604, all pixels in each image that meet the criteria for center points are detected. The performance of the step 604 is described below with respect to a single finder pattern (FIG. 7) in a single image, although the same techniques may be applied to some or all pixels in all images.

Figure 7:
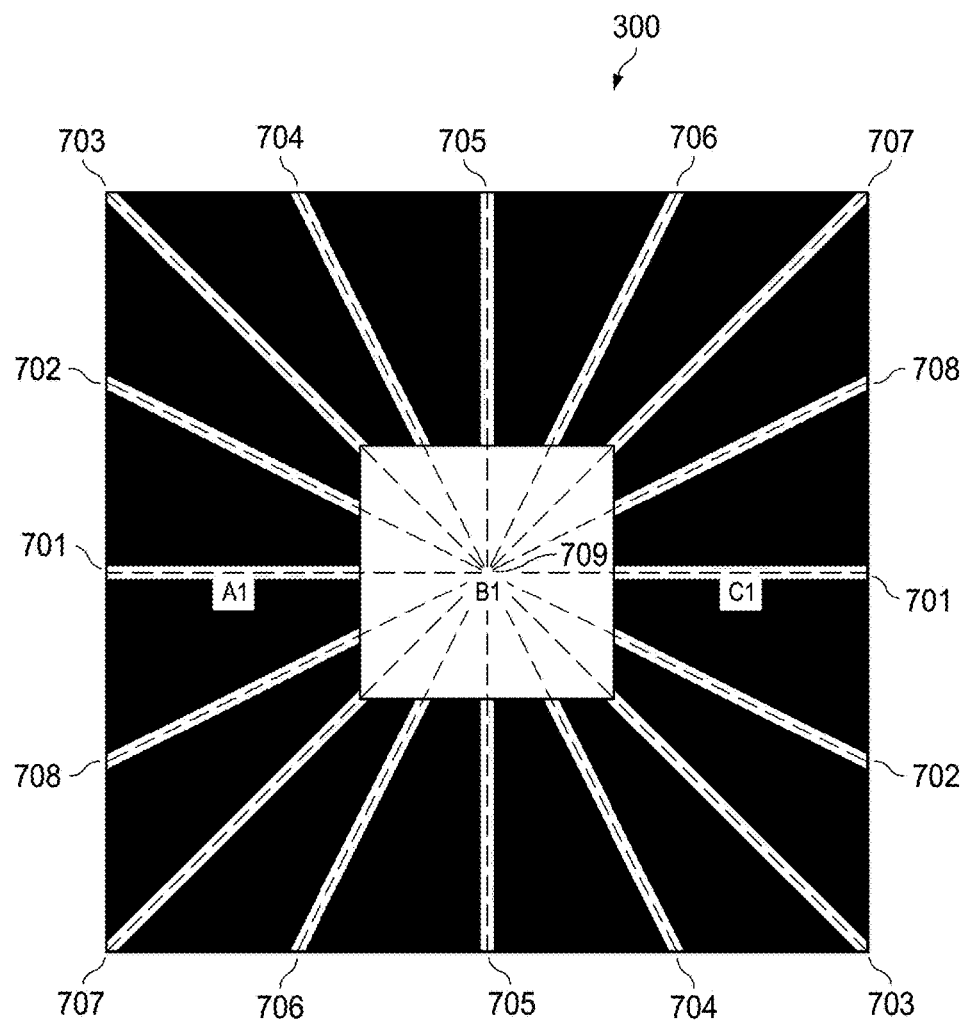
FIG. 7 is an illustrative finder pattern having multiple, equally-spaced center point detection lines passing through a candidate point of the finder pattern.

FIG. 7 depicts an illustrative finder pattern 300 having a candidate point 709. The candidate point 709 is representative of any pixel in the finder pattern 300 that is evaluated as a possible center point. (Although the present discussion is in the context of a single finder pattern in a single image, any pixel in any part of any image may be a candidate point.) In some embodiments, however, candidate points are restricted to only black pixels or only white pixels. If it is known that the center pixels of the finder patterns are white, then the multi-camera system is programmed to restrict candidate points to only white pixels. Conversely, if it is known that the center pixels of the finder patterns are black, then the multi-camera system is programmed to restrict candidate points to only black pixels. For purposes of this discussion, candidate points are restricted to only white pixels.

Referring still to FIG. 7, it is known that the center point of the finder pattern 300 will be a white pixel; accordingly, the candidate points are restricted to white pixels. The illustrative candidate point 709 shown in FIG. 7 is chosen from among the pixels of the finder pattern 300 because it is a white pixel. The candidate point 709 has eight equally-spaced center point detection lines 701-708 passing through it. (Any suitable number of center point detection lines may be used, but, in some embodiments, at least two such lines are used.) The center point detection lines 701-708 may be actual lines, meaning that the system overlays such lines on the image(s), or the lines may be virtual lines, meaning that the system operates as if the lines are present for purposes of detecting the center point, but the lines are not actually drawn on the image(s) themselves. Each of the center point detection lines 701-708 intersects each perimeter of the finder pattern 300 twice. For example, the line 701 intersects the perimeter of the square 302 twice and it intersects the perimeter of the square 304 twice.

Furthermore, each line 701-708 has multiple segments, with each segment located between a different pair of consecutive perimeter intersections. Thus, for instance, the line 701 has segments a1, b1, and c1, with segment a1 located between a pair of consecutive perimeter crossings, segment b1 located between a different pair of consecutive perimeter crossings, and segment c1 located between yet another pair of consecutive perimeter crossings. The step 604 includes measuring and comparing the lengths of the segments in each line 701-708. For instance, the multi-camera system may measure the lengths of segments a1, b1, and c1 in line 701 and determine a ratio of these segments. If the candidate point 709 is the center of the finder pattern 300, the lengths of the segments a1, b1, and c1 will be the same or within a predetermined range of each other. Stated another way, the ratio of the lengths of segments a1, b1, and c1 will be 1:1:1 or at least within a predetermined ratio range if the candidate point 709 is, in fact, the center point of the finder pattern 300. If the segment lengths are excessively dissimilar (i.e., beyond a predetermined range), the candidate point 709 being analyzed is determined to not be the center of the finder pattern 300.

Determining that the lengths of segments in a single center point detection line fall within a predetermined range is necessary, but not sufficient, to conclude that the candidate point 709 is the center of the finder pattern 300. If the candidate point 709 is the center of the finder pattern 300, the lengths of segments in other lines 702-708 also should fall within a predetermined range (e.g., approximately a 1:1:1 ratio). Accordingly, the step 604 includes determining the lengths of the segments in one or more other lines 702-708 and assessing whether the segment length ratios fall within predetermined ranges. As explained above, numerous pixels in each image may qualify as center points, including pixels that are located within the finder patterns and pixels that are located outside the finder patterns. As the predetermined ranges within which segment length ratios must fall is expanded, greater numbers of pixels may qualify as center points. As the predetermined ranges are compressed, fewer pixels may qualify as center points.

Figure 8A:
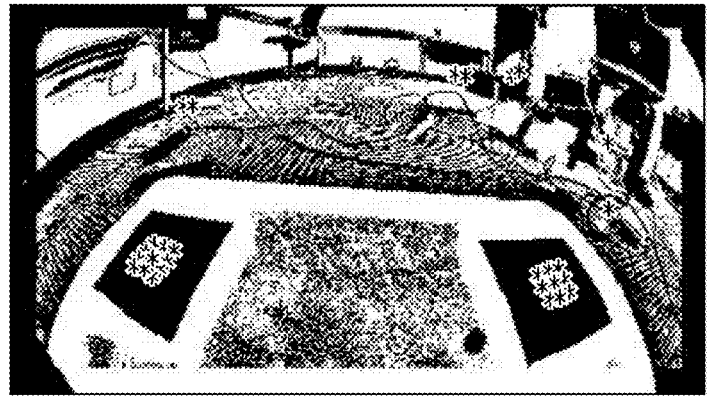
FIG. 8A is an image with multiple center point clusters.
Figure 8B:
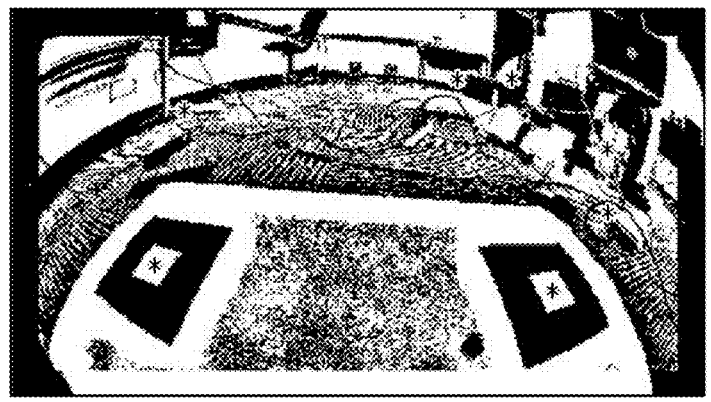
FIG. 8B is an image with multiple center points.

FIG. 8A depicts an illustrative, intermediate result of the step 604. The image depicted in FIG. 8A is a binarized version of the raw image depicted in FIG. 5A. The starred areas represent pixels that were identified as center points after the step 604 was performed on the image. In this image, the number of center points identified is relatively large because the predetermined range within which segment length ratios must fall to qualify as center points is relatively large. The center points in FIG. 8A form clusters. Step 604 includes identifying the centroid of each cluster and eliminating all other center points in each cluster, resulting in the image shown in FIG. 8B.

Referring again to FIG. 6, the method 600 next comprises locating the boundary points of the finder patterns (step 606). Boundary points are points along one or more perimeters of a finder pattern. For example, referring to FIG. 3A, points along the perimeter of the square 302 are boundary points. Similarly, points along the perimeter of the square 304 are boundary points. The multi-camera system may detect boundary points using the equally-spaced center point detection lines 701-708 of FIG. 7. In particular, for each point identified as a center point after step 604, the points at which lines 701-708 intersect with one or more perimeters of a finder pattern are identified as boundary points. For instance, in FIG. 7, assuming that the candidate point 709 is the center point of the finder pattern 300, the points at which the lines 701-708 intersect the perimeter of the square 304 and the perimeter of the square 302 are boundary points. The multi-camera system may detect the points at which the lines intersect the perimeter by following the lines and identifying color transitions. For instance, starting from point 709 and following line 701 in either direction, a white-to-black color transition is encountered at the perimeter of the square 304, followed by a black-to-white color transition at the perimeter of the square 302 (assuming that the finder pattern is positioned on a white background, as shown in FIG. 5A). The white-to-black transition marks the perimeter of the square 304, and, therefore, the points at which the line 701 intersects the white-to-black transition may be identified as boundary points. Similarly, the points at which the line 701 intersects the black-to-white transition may be identified as boundary points. The same is true for all lines 702-708 and the color transitions with which they intersect. As previously explained, the scope of disclosure encompasses any number of lines. In some embodiments, boundary points may be identified without the use of actual or virtual lines 701-708. In such embodiments, the multi-camera system attempts to detect color transitions in the area of an identified center point. When a color transition is identified, that color transition marks a boundary point.

Figure 9A:
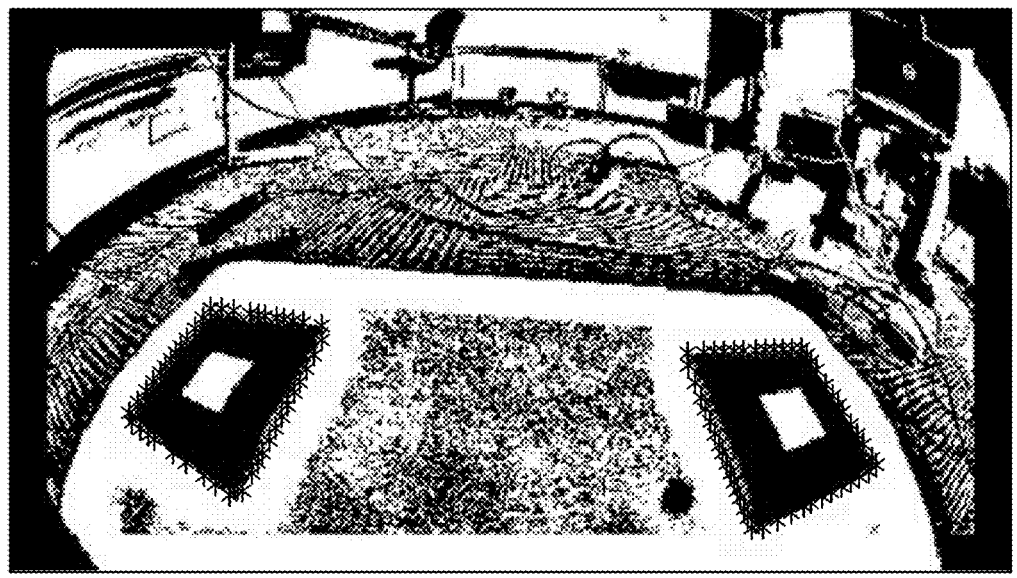
FIG. 9A is an image of multiple finder patterns having highlighted boundary points.

The starred areas in the finder patterns of FIG. 9A mark identified boundary points. In this embodiment, only boundary points along the perimeter of the square 302 have been identified. However, in other embodiments, only boundary points along the perimeter of the square 304 are identified. In yet other embodiments, boundary points along both perimeters are identified. In still other embodiments, a different finder pattern is used (e.g., as shown in FIG. 3B), and, in such embodiments, any suitable number of perimeters may be used to identify boundary points (e.g., when using the finder pattern 350 of FIG. 3B, boundary points may be identified along one, two, or three different perimeters). Boundary points may also be identified for one or more of the center points located in areas outside of the finder patterns, but such boundary points are eventually discarded, as described below.

Figure 9B:
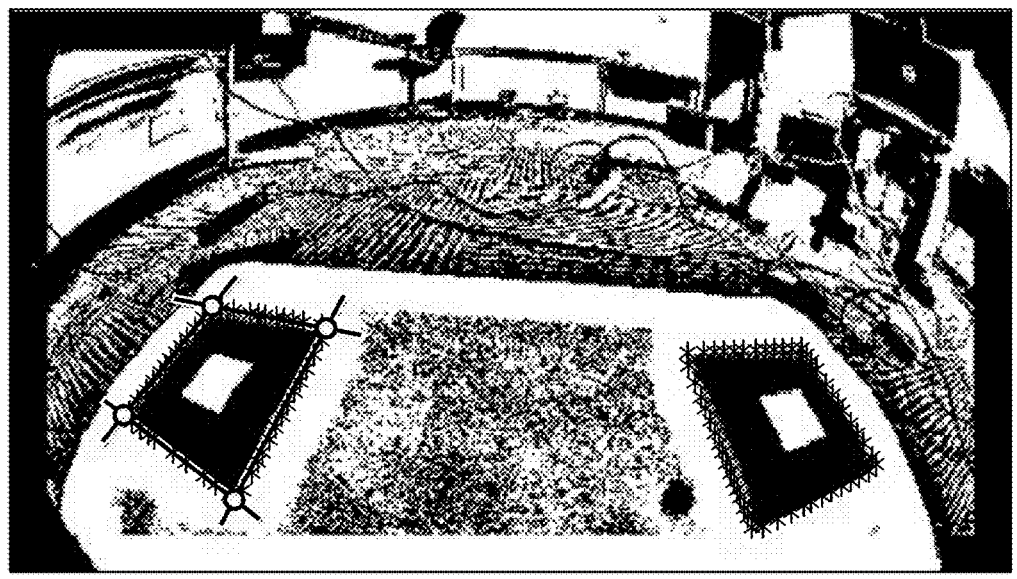
FIG. 9B is a reproduction of FIG. 9A but with fitted boundary lines and feature points highlighted on one of the finder patterns.

After boundary points have been identified, the process 600 comprises fitting boundary lines along the identified boundary points (step 608). Specifically, each set of boundary points along each side of a finder pattern square are evaluated to determine a best fit line through that set of boundary points. Any suitable fitting technique may be used. For instance, a fitted boundary line passing through a set of boundary points may attempt to minimize the sum of the distances between the fitted line and the boundary points in that set. In some embodiments, boundary points may be converted from a distorted fish-eye lens format to an undistorted format prior to fitting the boundary lines. In some embodiments, the distorted fish-eye lens format is used when fitting boundary lines. In some embodiments, boundary points in both distorted fish-eye lens format and undistorted format are used to fit boundary lines, and the images with the best-fit boundary lines (i.e., with the least error) may be used. FIG. 9B depicts illustrative, fitted boundary lines 902, 904, 906, and 908, one corresponding to the set of boundary points along each side of the square 302. Fitted boundary lines may also be identified in areas outside of the finder patterns, but these fitted boundary lines are eventually discarded, as described below.

The process 600 next includes locating the feature points (step 610). The feature points are the points at which the fitted boundary lines intersect. For instance, FIG. 9B shows feature points 306, 308, 310, and 312, which are the points at which the fitted boundary lines intersect with each other. Feature points may also be identified in areas outside of the finder patterns, but these feature points are discarded, as described below.

The process 600 next comprises removing false detections (step 612). False detections include center points, boundary points, fitted boundary lines, and feature points that do not correspond to a finder pattern. In some embodiments, false detections may be identified by comparing the distances between identified feature points (i.e., lengths of fitted boundary lines) to determine whether they meet one or more predetermined criteria. For instance, in at least some applications the finder patterns are squared-shaped, and so the lengths of the various fitted boundary lines may be compared as desired to determine whether the boundary lines form a roughly square shape. If not, the fitted boundary lines and all associated data (i.e., feature points, boundary points, center points) may be removed. Because the images may be distorted (due to the use of a wide angle lens such as a fish-eye lens), the criteria for determining whether a set of fitted boundary lines describe a square (or any other shape) should be carefully selected. The same principle applies for any step of the method 600.

Alternatively or in addition, false detections may also be identified by determining the number N of finder patterns that an image is known to contain and identifying N center points whose fitted boundary lines have the lowest overall fitting error. For instance, if an image is known to contain two finder patterns, the two center points whose fitted boundary lines have the lowest fitting errors are identified. The identified center points are designated as the true center points of the finder patterns, and the feature points associated with the true center points are identified as true feature points of the finder patterns. The remaining center points and associated data are removed.

Finally, the method 600 comprises correlating the true feature points from separate images to determine the perspective transformation matrix (step 614). As explained above, when a common finder pattern appears in multiple images taken from multiple cameras in a multi-camera system, that common finder pattern may serve as a point of reference to determine how to integrate future images captured by those cameras. This is accomplished by automatically identifying the feature points of the finder pattern(s) (as described above) and then determining a perspective transformation matrix using the feature points. The specific technique by which a perspective transformation matrix is determined is known and thus is not described here. Once determined, however, the perspective transformation matrix may be programmed into a computer that receives images from the multiple cameras in the multi-camera system (in, e.g., a vehicle) and that computer may use the matrix to integrate images captured from that time forward. The process 600 may be modified as desired, including by adding, deleting, modifying, or rearranging one or more steps.

Figure 10:
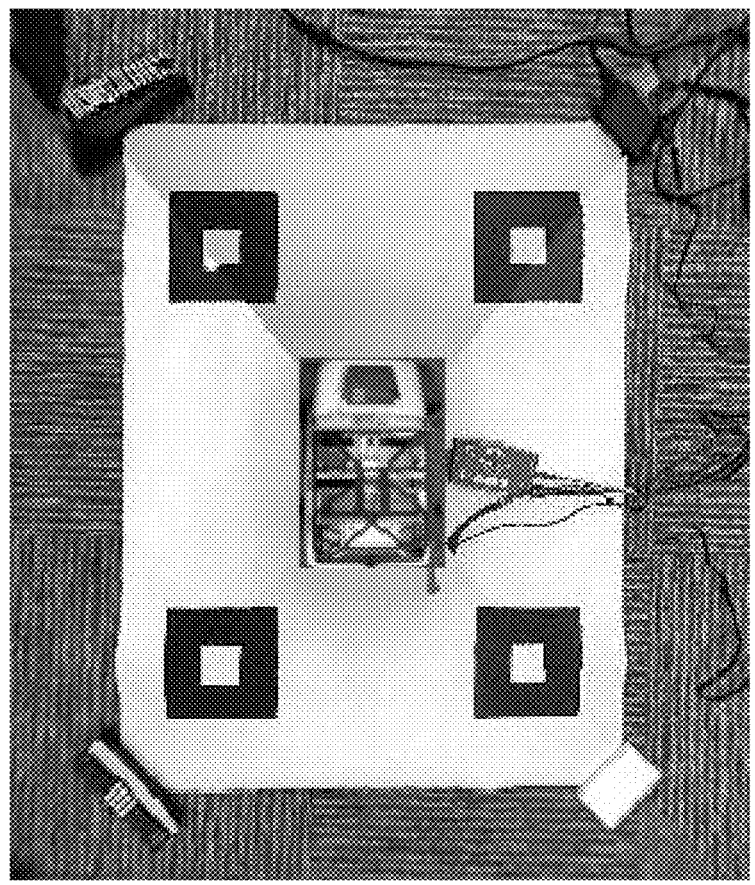
FIG. 10 is an integrated, top-down view image of a multi-camera vehicle and multiple finder patterns.

FIG. 10 depicts a top-down, or "bird's eye," view of the finder patterns 402, 404, 406, and 408 depicted in FIGS. 5A-5D, as well as the vehicle on which the cameras used to capture the finder pattern images are mounted. The image shown in FIG. 10 is produced by detecting true feature points as described above, determining a perspective transformation matrix using those feature points, and then integrating images captured by the different cameras using the matrix.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method, comprising:
capturing an image of a finder pattern using a first camera in a multi-camera system;
locating a predetermined point in the finder pattern;

locating multiple boundary points along a perimeter of the finder pattern using said predetermined point;

fitting boundary lines along the perimeter of the finder pattern using said multiple boundary points;

locating feature points along said perimeter using the fitted boundary lines; and generating a perspective transformation matrix based on said feature points.

2. The method of claim 1, wherein said predetermined point of the finder pattern is at a center of the finder pattern.

3. The method of claim 1, wherein the finder pattern comprises a first square centered within a second square.

4. The method of claim 3, further comprising binarizing the image, wherein, after said binarization is complete, one of the first and second squares is white and the other of the first and second squares is black.

5. The method of claim 4, wherein said binarized image includes said finder pattern positioned on an object, said object has a color matching that of the first square.

6. The method of claim 1, further comprising using the perspective transformation matrix to generate a bird's-eye view of an object on which said multi-camera system is mounted.

7. The method of claim 1, wherein locating the predetermined point of the finder pattern comprises identifying a point in said finder pattern that lies along a line that intersects each perimeter of the finder pattern twice, wherein said line has multiple segments, each segment located between a different pair of consecutive perimeter crossings, and wherein a ratio of lengths of said segments falls within a predetermined ratio range.

8. The method of claim 1, wherein locating said multiple boundary points comprises identifying points at which a line passing through the predetermined point intersects said perimeter of the finder pattern.

9. The method of claim 1, wherein said feature points are points at which said fitted boundary lines intersect.

* * * * *